(12) United States Patent
Chauhan

(10) Patent No.: US 11,943,618 B2
(45) Date of Patent: Mar. 26, 2024

(54) FORCING RE-AUTHENTICATION OF USERS FOR ACCESSING ONLINE SERVICES

(71) Applicant: T-Mobile USA, Inc., Bellevue, WA (US)

(72) Inventor: Kanakrai Chauhan, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/137,277

(22) Filed: Dec. 29, 2020

(65) Prior Publication Data
US 2022/0210646 A1   Jun. 30, 2022

(51) Int. Cl.
| H04W 12/082 | (2021.01) |
| H04W 4/50 | (2018.01) |
| H04W 4/60 | (2018.01) |
| H04W 12/069 | (2021.01) |
| H04W 12/37 | (2021.01) |
| H04W 4/24 | (2018.01) |

(52) U.S. Cl.
CPC ........... *H04W 12/082* (2021.01); *H04W 4/50* (2018.02); *H04W 4/60* (2018.02); *H04W 12/069* (2021.01); *H04W 12/37* (2021.01); *H04W 4/24* (2013.01)

(58) Field of Classification Search
CPC ... H04W 4/50–80; H04W 8/18; H04W 8/183; H04W 8/20; H04W 4/24; H04W 88/08–188
See application file for complete search history.

(56) References Cited

U.S. PATENT DOCUMENTS

| | | | | |
|---|---|---|---|---|
| 2009/0328186 A1* | 12/2009 | Pollutro | ................ | H04L 63/067 726/13 |
| 2011/0053618 A1* | 3/2011 | Lin | ........................ | H04W 4/14 455/466 |
| 2011/0179478 A1* | 7/2011 | Flick | ..................... | H04L 9/0822 726/9 |
| 2013/0086670 A1* | 4/2013 | Vangpat | .............. | H04L 63/0815 726/8 |
| 2013/0275560 A1* | 10/2013 | Bestmann | ........... | H04L 41/0803 709/219 |
| 2014/0082715 A1* | 3/2014 | Grajek | ................ | H04W 12/068 726/8 |
| 2014/0282940 A1* | 9/2014 | Williams | ............ | H04L 63/0807 726/6 |

(Continued)

*Primary Examiner* — San Htun

(57) ABSTRACT

Described herein are techniques for preventing a user from continuing to access an online service once access rights have been revoked. In some embodiments, the techniques comprise receiving a request to determine a current status of access rights in association with a user and an online service, determining, based on one or more conditions associated with the online service, the current status of access rights, upon determining that the current status of access rights indicates that the user is not authorized to access the online service, identifying at least one user device associated with the user, generating programmatic instructions to cause a session token associated with the online service to be removed from a memory of the at least one user device, and providing the programmatic instructions to the at least one user device.

17 Claims, 9 Drawing Sheets

(56) References Cited

U.S. PATENT DOCUMENTS

| | | | | |
|---|---|---|---|---|
| 2014/0351370 | A1* | 11/2014 | Ashley | H04L 67/148 |
| | | | | 709/217 |
| 2015/0373015 | A1* | 12/2015 | Mary | H04L 63/0876 |
| | | | | 726/9 |
| 2016/0065541 | A1* | 3/2016 | Winner | H04L 63/0815 |
| | | | | 726/6 |
| 2017/0155640 | A1* | 6/2017 | Rykowski | H04L 63/0823 |

* cited by examiner

FORCING RE-AUTHENTICATION OF USERS FOR ACCESSING ONLINE SERVICES

BACKGROUND

While mobile devices were once used almost exclusively for mobile communications, those mobile devices are now also used to access a variety of online services. Providers of these online services typically struggle to provide those services in a manner that is easy to access while preventing their unauthorized use. As access to an online service is made more convenient for consumers, new ways of gaining unauthorized access to the online service are also created.

SUMMARY

Techniques are provided herein for preventing a user from continuing to access an online service once access rights have been revoked. More particularly, embodiments of the disclosure are directed to techniques in which authentication for an online service can be reset in order to prevent unauthorized use of an online service while providing users with the convenience that results from the use of session tokens. In some embodiments, a user device or a third-party service provider may submit a request to a core network of a wireless carrier network to determine a current status of access rights for a user with respect to an online service. In other embodiments, the core network of the wireless carrier network may detect one or more changes made to an account associated with a user. The core network then initiates a request to a session management platform that determines a current status of access rights for the user and online service. If the user is determined to currently not have access rights to an online service, then programmatic instructions may be generated to cause a session token to be removed from memory of a user device. In this way, unauthorized use of an online service can be prevented in a non-invasive manner.

In one embodiment, a method is disclosed as being performed by a wireless carrier network, the method comprising receiving a request to determine a current status of access rights in association with a user and an online service, determining, based on one or more conditions associated with the online service, the current status of access rights, upon determining that the current status of access rights indicates that the user is not authorized to access the online service, identifying at least one user device associated with the user, generating programmatic instructions to cause a session token associated with the online service to be removed from a memory of the at least one user device, and providing the programmatic instructions to the at least one user device.

An embodiment is directed to a computing device comprising: a processor; and a memory including instructions that, when executed with the processor, cause the computing device to, at least receive a request to determine a current status of access rights in association with a user and an online service, determine, based on one or more conditions associated with the online service, the current status of access rights, upon determining that the current status of access rights indicates that the user is not authorized to access the online service, identify at least one user device associated with the user, generate programmatic instructions to cause a session token associated with the online service to be removed from a memory of the at least one user device, and provide the programmatic instructions to the at least one user device.

An embodiment is directed to a non-transitory computer-readable media collectively storing computer-executable instructions that upon execution cause one or more computing nodes to collectively perform acts comprising receiving a request to determine a current status of access rights in association with a user and an online service, determining, based on one or more conditions associated with the online service, the current status of access rights, upon determining that the current status of access rights indicates that the user is not authorized to access the online service, identifying at least one user device associated with the user, generating programmatic instructions to cause a session token associated with the online service to be removed from a memory of the at least one user device, and providing the programmatic instructions to the at least one user device.

The foregoing, together with other features and embodiments will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
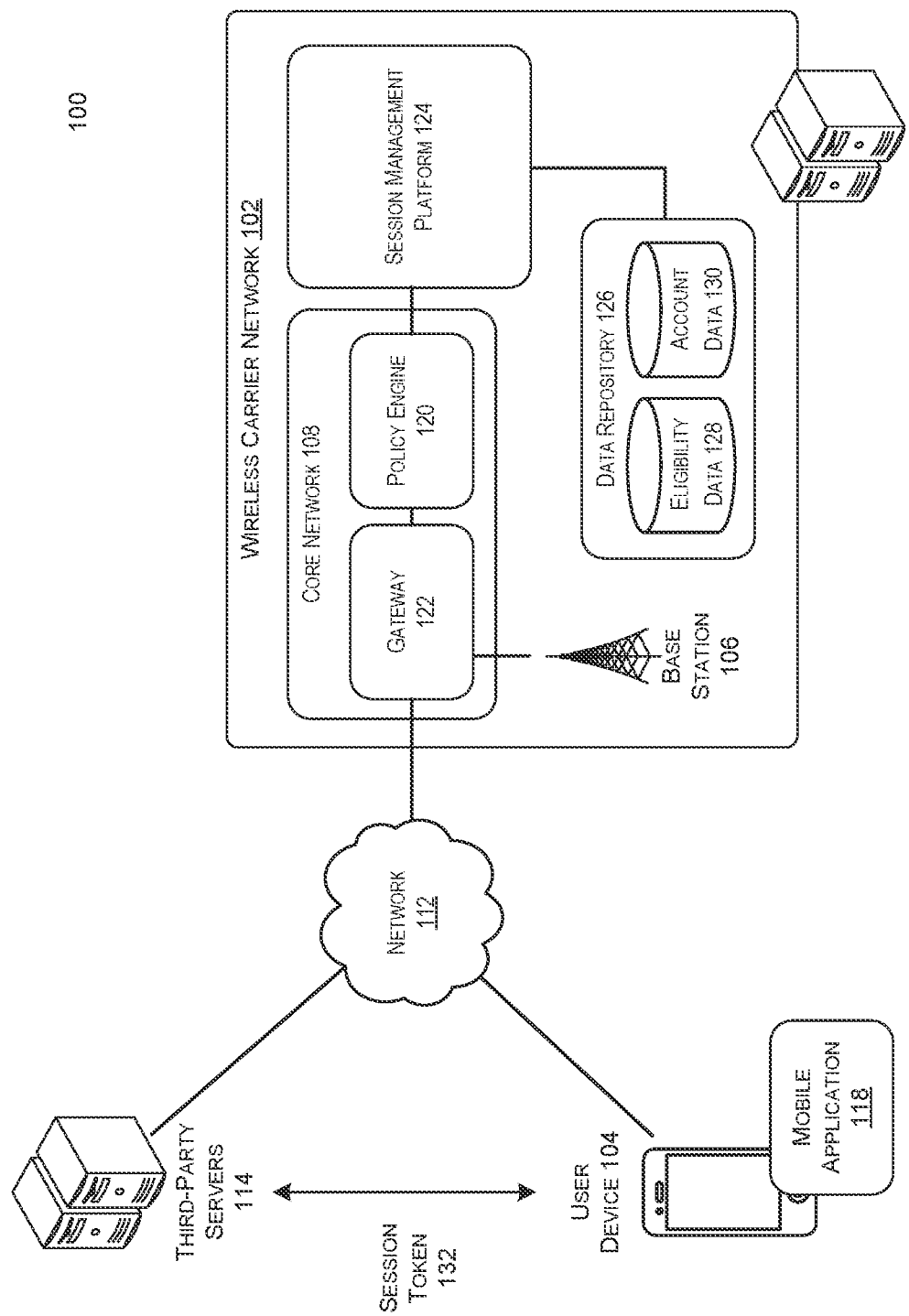
FIG. 1 illustrates an example architecture of a wireless carrier network for implementing techniques for forcing re-authentication of users in accordance with embodiments of the disclosure.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

This disclosure describes techniques that may be used to force authentication, or re-authentication, of a user of an online service. When accessing a service (e.g., an online service), users are sometimes able to skip authentication via the use of a session token that stores an authentication status of the user. In some embodiments, a status may be determined with respect to the user's access to the service. Upon a determination that the user does not currently qualify to access the service, the system may cause one or more session tokens to be removed from, or updated on, the user device so that future attempts to access the service will force reauthentication of the user.

A number of third-party service providers often provide their services to consumers via the users' mobile devices, and often via a communication channel established over a wireless carrier network. Examples of such services may include video streaming services, image storing and sharing services, social networking services, or any other suitable service. A number of those third-party service providers may provide access to a Software as a Service (SaaS) platform which enable such services.

Each third-party service provider may maintain information related to an account for a user. In order to access that information, and/or functionality associated with the service, the user may be required to log into that account via an authentication process. Some third-party service providers use session tokens in order to provide convenience to customers. A session token is any piece of data that is stored on a user device and used in network communications to identify a series of related message exchanges (i.e., a session). In some embodiments, a session token for a service stores an authentication status so that a user who is authenticated once will not need to be re-authenticated each time that she or he uses the service. However, when an account no longer qualifies for the service (e.g., when a user cancels the service or moves away from a plan that has the service) the session token continues to enable the user to use the service without reauthentication. Since session tokens can be active for a number of years (they typically expire every two years), users may be able to access services that they do not qualify for long after they have stopped qualifying for those services.

In some embodiments, an application programming interface (API) is provided that, when called, checks a current status of a user with respect to a particular service. Such a call to the API may be made by software executing on a mobile device. One or more policies stored in relation to the service may be retrieved in order to assess the current status of an account associated with the user device. If the current status is one that does not qualify for access to the service, instructions are provided to the user device to cause it to delete or overwrite the session token. Absent a current session token, the service may require authentication the next time that the service is requested. In some embodiments, the API may be called each time that the service is executed and may run in the background in parallel to an initiation of the service.

Embodiments of the disclosure provide for a number of advantages over conventional systems. For example, embodiments of the disclosure enable online service providers to continue to provide convenience to their users via the use of a session token, while also enabling that service to be restricted to users that qualify for the service. Embodiments of the disclosure may be configured to run in the background so that the providing of the online service is not disrupted.

FIG. 1 illustrates an example architecture of a wireless carrier network for implementing techniques for forcing re-authentication of users in accordance with embodiments of the disclosure. The architecture 100 may include a wireless carrier network 102 that serves multiple user devices, such as user devices 104. The user device 104 may include any of a feature phone, a smartphone, a tablet computer, a phablet, an embedded computer system, a personal computing device, or any other device that is capable of using the wireless communication services that are provided by the wireless carrier network 102 to communicate with other electronic devices.

The wireless carrier network 102 may include multiple base stations, such as the base station 106, as well as a core network 108. The wireless carrier network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long-term Evolution (LTE), CDMA-2000 (Code Division Multiple Access 2000), 4th Generation (4G), $5^{th}$ Generation (5G), and/or so forth. The base stations are responsible handling data traffic between user devices and the core network 108. In some embodiments, the base stations may be in the form of eNodeB nodes. Each eNodeB node may include a base transceiver system (BTS) that communicates via an antennae system over an air-link with one or more user devices that are within range. The antenna system of an eNodeB node may include multiple antennae that are mounted on a radio tower to provide a coverage area that is referred to as a "cell." The BTS may send RF signals to user devices and receive radio signals from user devices.

The core network 108 may provide telecommunication and data communication services to multiple user devices 104. For example, the core network 108 may connect the user devices 104 to other telecommunication and data communication networks, such as a network 112 (e.g., the Internet) and a public switched telephone network (PSTN). Accordingly, data packet communications via the core network 108 and the Internet may support a variety of services provided by third-party provider servers 114. Additionally, each of the multiple user devices 104 may be further configured to interact with a network 112 via an alternative communication channel. For example, one or more of the user devices 104 may establish communication with the network 112 via short-range wireless communication with a local network, such as a local wireless access network (WLAN) maintained by a router or a mobile phone in communication with the device (e.g., via Bluetooth®, WiFi, or other suitable short-range wireless means).

In some embodiments, a user device 104 may be any suitable electronic device capable of interacting with at least one other electronic device (e.g., third-party servers 114) in order to consume online services. In some embodiments, the user device 104 may include one or more outputs (e.g., a display, speakers, etc.) via which multimedia content may be presented to a user. Additionally, the user device 104 may include one or more input devices configured to collect input from a user of the user device. The user device 104 may include a memory that stores computer executable instructions. In some embodiments, that memory may also store one or more session tokens associated with various online services. In some embodiments, the user device 104 may have installed upon it a mobile application 118 configured to provide an online service associated with a third-party server 114. In some cases, the mobile application 118 may be a special-purpose software application that is configured to provide access to functionality associated with the online service. In other cases, the mobile application 118 may be a browser application that enables interaction with the third-party servers 114 via a network 112.

The core network 108 may include at least a policy engine 120 and a gateway 122. The policy engine 120 may be a software component that determines policy and enforces policy rules and serves to establish communication sessions and allocate bandwidth to devices associated with those communication sessions. In various embodiments, the policy engine 120 may include a Policy and Charging Rules Function (PCRF) or another equivalent core network component of the wireless carrier network 102. Accordingly, the policy engine 120 may interface with the gateway 122 to handle incoming and outgoing communications.

The gateway 122 may include one or more servers and related components that are tasked with providing connectivity between the core network 108, various user devices (e.g., the user devices 104), and one or more third-party servers 114 by acting as a point of entry and exit for data traffic. In turn, the core network 108 may provide the user devices with data access to external packet data networks 112, such as the networks of other wireless carrier networks or the Internet. Accordingly, the gateway 122 may perform functions such as policy enforcement, packet filtering, packet screening, and/or charging support. In various embodiments, the gateway 122 may be a Packet Data Network Gateway (PGW) or another equivalent core network component of the wireless carrier network 102.

In some embodiments, the wireless carrier network 102 may include a session management platform 124 for determining a current status of access rights with respect to a particular online service and forcing an authentication reset upon determining that access to an online service is unavailable. Additionally, the wireless carrier network 102 may include one or more data repository 126 that stores information associated with online services, user accounts, or any other suitable information. For example, such a data repository 126 may include at least a data store housing eligibility data 128 that includes rules for accessing online services, as well as account data 130 that includes information pertaining to individual user accounts.

By way of illustrating various interactions between the components depicted in FIG. 1, consider the following example. In this example, a user of a user device 104 attempts to access an online service associated with a third-party server 114 via a connection using the wireless carrier network 102. Initially, the user of the user device 104 may be asked to provide login credentials in order to access an account associated with that user. At that time, the third-party server 114 may perform an initial check to determine whether the user is authorized to access the online services. Upon determining that the user is authorized to access the online services, the third-party server 114 may provide a session token 132 to the user device 104 to be placed in memory. The session token 132 includes an authentication status as determined by the third-party server during its initial assessment with respect to access rights. On future attempts to access the online service, the user device 104 provides the third-party server 114 with the session token 132 instead of requiring authentication once more from the user.

In some embodiments, the initial authorization determination described above is made by the wireless carrier network 102 based on information associated with an account maintained by that wireless carrier network 102. For example, a user may have access to the online service provided by the third-party server 114 by virtue of his or her association with the wireless carrier network 102. In these cases, the authentication of the user and determination of current access rights may be performed by the wireless carrier network 102 instead of by the third-party server. In this case, the session token 132 may also be provided to the user device 104 by the wireless carrier network 102. In this situation, when a user attempts to access the online service, the third-party server 114 may not have direct access to access right eligibility and may rely upon the session token 132 as an indication of authorization.

In embodiments, the core network 108 may receive a request from a user device 104 to determine a current status of access rights for the user device 104 with respect to the online service. This request may be transmitted in parallel to a request to access the online service. For example, a user may execute a mobile application 118 on his or her user device 104. Upon execution, the mobile application 118 may provide a session token 132 to the third-party server 114 in order to gain access to the online service. The user device 104 or the third-party server 114 may, at that time, transmit the request to the core network 108. Such a request is then routed to the session management platform 124.

In some embodiments, the session management platform 124 may determine a current status of access rights for a particular online service in response to a received request. Such a request may be received from a software application associated with that online service (e.g., mobile application 118). To do this, the session management platform 124 may, upon receiving a request in relation to an online service, retrieve one or more eligibility requirements for the online service from the eligibility data 128. Additionally, the session management platform 124 may retrieve information related to the user device 104 and/or an account associated with the user device 104 from the account data 130. The retrieved data may then be compared in order to determine a current state of eligibility for the account with respect to the online service.

Upon determining that the user is currently eligible to access the online services, the session management platform 124 may take no further action. However, upon determining that the user is not currently eligible to access the online service, the session management platform 124 may initiate a reset of the session token 132. In some embodiments, the session management platform 124 provides instructions to the user device 104 to cause the user device to delete or otherwise remove the session token 132 from memory. In some embodiments, the user's current attempt to access the online services may be successful because of the presence of the session token 132 at the time of the attempt. In this way, session tokens 132 can be updated so that a user is forced to re-authenticate himself/herself on the next attempt to access a service. This prevents disruption of the online service to the user and allows the user to provide different login credentials in the event that the user has access to more than one account.

Figure 2:
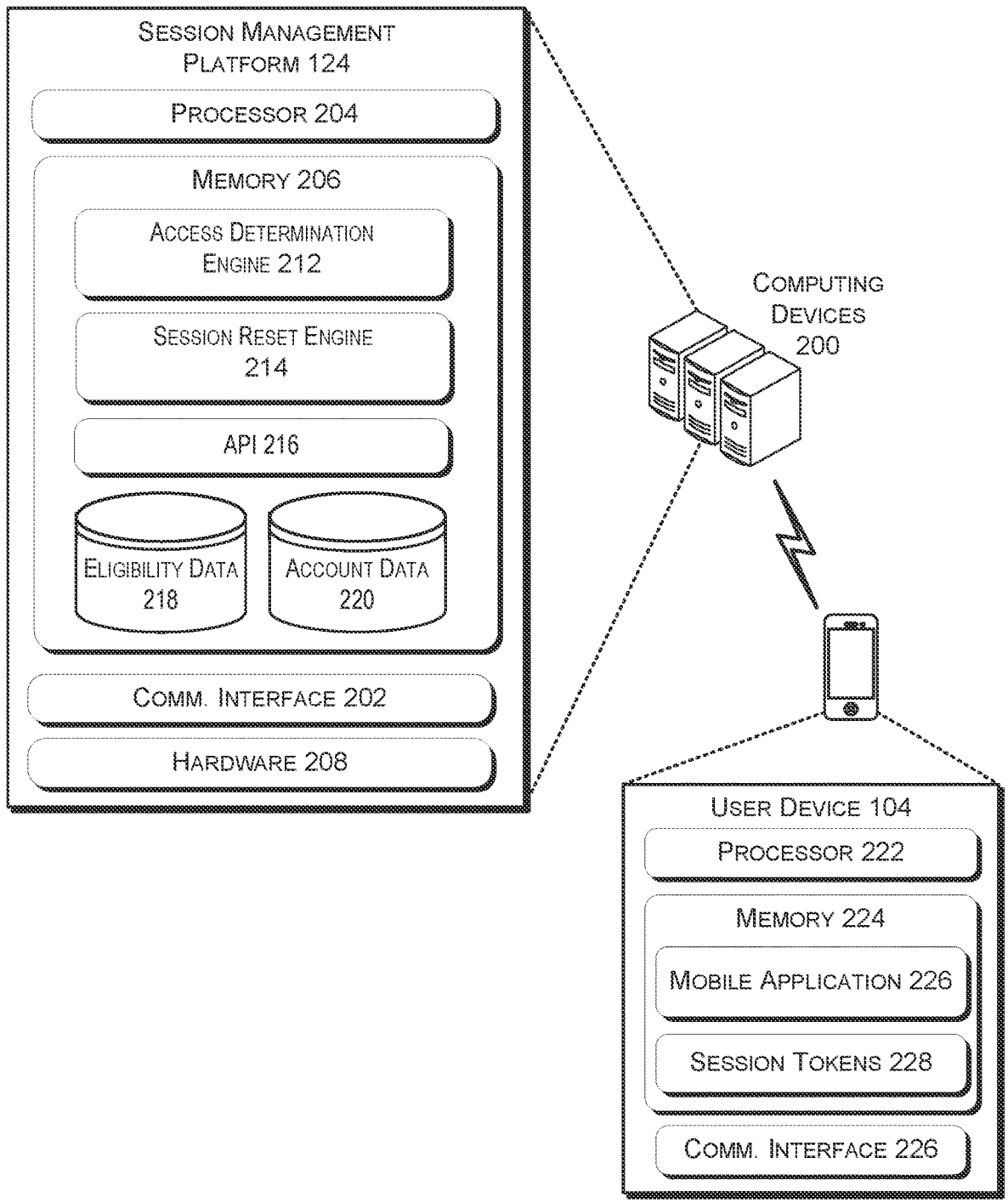
FIG. 2 is a block diagram showing various components of a system architecture that supports removal of a session token in order to force reauthentication of a user in accordance with embodiments.

FIG. 2 is a block diagram showing various components of a system architecture that supports removal of a session token in order to force reauthentication of a user in accordance with embodiments. The system architecture may include one or more computing devices 200 on which a session management platform 124 is implemented. The computing devices 200 may include a communication interface 202, one or more processors 204, memory 206, and hardware 208. The communication interface 202 may include wireless and/or wired communication components that enable the computing devices 200 to transmit data to, and receive data from, other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 204 and the memory 206 of the computing devices 200 may implement functionality from or one or more software modules and data stores. Such software modules may include routines, program instructions, objects, and/or data structures that are executed by the processors 204 to perform particular tasks or implement particular data types. The one or more software modules may include at least a module for determining a current status of access rights with respect to a user and an online service (e.g., access determination engine 212) as well as a module for resetting or removing a session token on one or more user devices (e.g., session reset engine 214). The memory may include an application programming interface (API) 216 that enables interaction between a user device or third-party server and the session management platform 124. For example, a user device or third-party server platform may submit a request to the session management platform by calling one or more methods available via the API 216. Additionally, the memory 206 may include one or more data stores to include at least a database that includes requirements for obtaining access to online services (e.g., eligibility data 218) and information associated with one or more user accounts (e.g., account data 220).

The access determination engine 212 may be configured to determine a current status of access rights for a user with respect to a particular online service. In some embodiments, the session management platform 124 receives a request from an online service provider or a user device. In some cases, the request may be provided to the session management platform upon an attempt by a user of a user device to access an online service. In some embodiments, the request may be received on a periodic basis (e.g., monthly, weekly, daily, hourly, etc.). Such a request may be received via the API 216 of the session management platform 124. Upon receiving the request, the session management platform 124 may forward the request to the access determination engine 212 to be processed.

Upon receiving a request to determine access rights for a user with respect to an online service from the session management platform, the access determination engine 212 may retrieve information associated with access rights requirements from the eligibility data 218 as well as information associated with an account of the user from the account data 220. The access determination engine 212 then identifies one or more conditions to be met within the access rights requirements (e.g., account type, payment status, usage limits, etc.). The access determination engine 212 then compares relevant portions of the retrieved account information to those conditions to determine to what extent the conditions are satisfied by the account information. In some embodiments, a set of conditions may be retrieved in association with the online service and each condition in the set of conditions must be met in order for the user account to have access rights for the online service. In some embodiments, one or more of the conditions in the set of conditions may be optional rather than required. In some embodiments, the access determination engine 212 may be configured to determine a level of access rights currently associated with a particular user and online service. For example, the access determination engine 212 may determine, based on user account information, what particular services and/or content are available to the user via the online service. In some embodiments, the access determination engine 212 may identify a number of user devices associated with the same account and may determine what online services are available for each of the user devices.

The session reset engine 214 may be configured to reset or remove a session token included in a memory of one or more user devices. In some embodiments, the session reset engine 214 may be called by the access determination engine 212 upon determining that a current user of a user device does not have access rights to an online service. In some embodiments, the session reset engine 214 may be called with respect to multiple user devices associated with a user. In some cases, the session reset engine 214 may determine a type (e.g., brand and model) of the user device and/or an operating system operating on the device from which a session token is to be removed. In some embodiments, the session reset engine 214 may determine token storage procedures associated with the inline service. For example, the session reset engine 214 may identify naming conventions and storage locations for the session token associated with a particular online service. In some embodiments, the session token may be a random (or pseudorandom) string of characters that is mapped to a user's communication session. The session reset engine 214 may then generate instructions that are compatible with the user device to cause that user device to remove the session token having the determined naming from the determined location in memory. These instructions may then be provided to the user device. In some embodiments, the generated instructions are pushed to the user device by the wireless carrier network via a push message within a software update.

The user device 104 may be any electronic device capable of interacting with the computing devices 200 as described herein. The user device 104 may include a processor 222 and a computer readable memory 224 as well as a communication interface 226. The memory 224 may include at least one mobile application 226. Such a mobile application may be configured to enable a user of the user device to access one or more online services provided by a third-party service provider. In some embodiments, the memory 224 may also store a number of session tokens 228, with each session token associated with a particular online service. Upon interaction with a third-party server, the user device may be configured to provide one or more of the session tokens 228 to the third-party server in response to receiving a request for authentication from the third-party server if such a session token is available. If no session token is available to be provided in response to a request for authentication, then a mobile application 226, upon attempting to access the online service, may cause a user of the user device to be prompted for authentication credentials. The provided credentials may then be checked to determine current access rights for the user.

Figure 3:
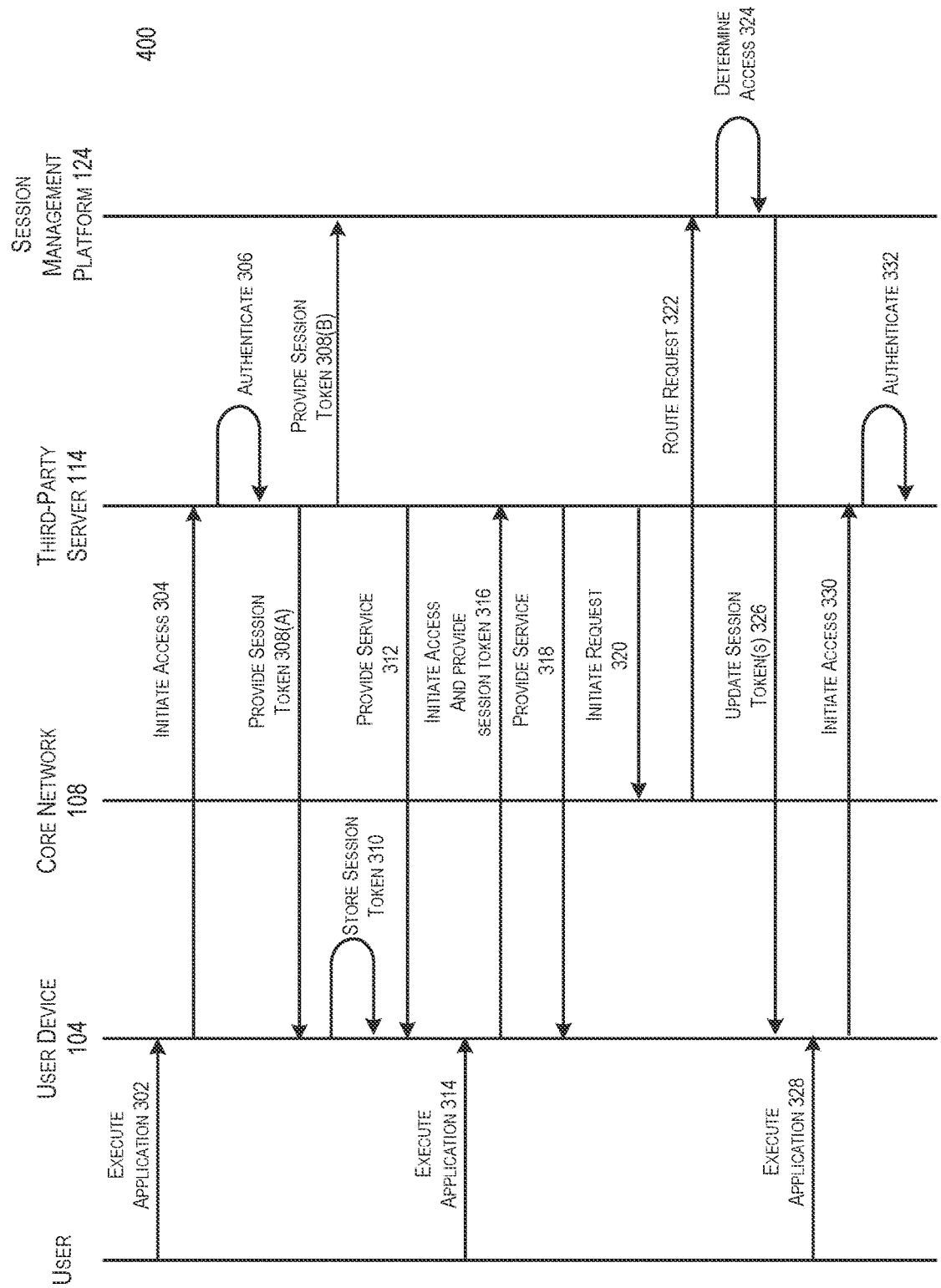
FIG. 3 depicts a flow diagram showing an example process flow for forcing reauthentication of a user of online services upon detecting a loss of access rights in accordance with embodiments.

FIG. 3 depicts a flow diagram showing an example process flow for forcing reauthentication of a user of online services upon detecting a loss of access rights in accordance with embodiments. The process 300 comprises interactions between various components of the architecture 100 described with respect to FIG. 1. More particularly, the process 300 comprises interactions between a user device 104, a core network 108 of a wireless carrier network, a session management platform 124 of the wireless carrier network, and at least one third-party server 114. Additionally, at least a portion of the process 300 may comprise one or more interactions between a user and the user device 104.

At 302 of the process 300, a user may initially attempt to access an online service. In some embodiments, this may comprise the execution of a mobile application installed upon the user device by the user. At 304, the user device initiates access to the online service by establishing a connection with a third-party server that provides that online service. This connection may use a communication channel established via the core network of a wireless carrier network.

Upon receiving a request to access the online service, the third-party server may attempt to retrieve a session token from the user device. If such a session token is unavailable (e.g., because the online service has not previously been accessed via the user device), then the third-party server will be unable to retrieve such a session token. Upon determining that such a session token is not available on the user device, the third-party server may establish a new communication session with the user device. To do this, the third-party server may request login credentials (e.g., a username and password) from the user device. In some embodiments, this may comprise presenting a login screen to the user via the user device. Upon receiving login credentials form the user, the third-party server may authenticate the user based on the login credentials at 306. In some embodiments, this may comprise comparing the received login credentials to account data stored by the third-party server. In some embodiments, this may comprise providing the login credentials to the session management platform via the core network in order to receive an indication of a current status of access rights for the online service based on the received login credentials.

Once the user has been authenticated, the third-party server may generate a session token to be associated with further requests received from the user device. In some embodiments, a session token may include a random, or pseudorandom, string of characters that is mapped to a set of communications (e.g., communications between the user device and the third-party server) within a database. The third-party server may then provide the session token to the user device at 308(A). In some cases, the third-party server may also provide the session token to the session management platform at 308(B), which may then store that session token in association with the user's account.

At 310, the user device may store the received session token in its local memory. In some embodiments, the session token may be encrypted and/or stored in a secure element of the memory. In some embodiments, the user device may also store an association between the session token and the third-party server.

Once the user device has been authenticated at 306, the user device may be provided with access to the online service at 312. Note that this may occur in parallel to (e.g., at substantially at the same time as) the portions of the process described at 308 and 310. The third-party server may provide an online service in a variety of ways. For example, in some embodiments, the third-party server provides an address to the user device at which the online service can be accessed. In another example, the third-party server provides a cryptographic key that can be used to access media content (e.g., streaming video) via the online service. In this example, the media content may be hosted on one or more edge servers in an encrypted format. The cryptographic key may be used by the user device to decrypt, and hence access, the media content hosted on the one or more edge servers.

At a subsequent time, the user may again attempt to access the online service at 314. In this scenario, assume that the user has, since a time associated with block 302, lost his or her access rights with respect to the inline service (e.g., the user no longer qualifies to access the online service). The user may attempt to access the online service in a manner similar to that described with respect to 302 above.

Upon receiving the second request to access the online service, the third-party server may attempt to retrieve a session token from the user device at 316. In some embodiments, the user device may retrieve the session token from its memory based on a mapping between the session token and the online service/third-party server.

Upon receiving the session token from the user device, the third-party server 318 may proceed to provide the user device with access to the online service at 318 in a manner similar to that described above with respect to 312. In addition, the third-party server may initiate a request for a redetermination of access rights at 320. In some embodiments, such a request may be initiated upon determining that some predetermined amount of time has passed since the user's status with respect to access rights for the online service has been verified. For example, such a request may only be initiated upon determining that 30 days have passed since the last time that the user's access rights were verified with respect to the online service. While the request is described here as being initiated by the third-party server, in some embodiments the request may be initiated by the user device. For example, a mobile application associated with the online service that is installed upon the user device may initiate such a request. The request may be provided to the core network, which then routes the request to the session management platform at 322.

Upon receiving the request, the session management platform may determine a current status of access rights for a user with respect to the online service. To do this, the session management platform may retrieve information associated with access rights requirements as well as information associated with an account of the user. The session management platform (e.g., via an access determination engine 212) then identifies one or more conditions to be met within the access rights requirements (e.g., account type, payment status, usage limits, etc.). Relevant portions of the retrieved account information are then compared against those conditions to determine to what extent the conditions are satisfied by the account information. The session management platform then makes a determination as to a current status of access rights for the user with respect to the online service. In some embodiments, such a determination is made on a device-by-device basis for each of a number of user devices determined to be associated with the user. For example, a user may have access rights to an online service for only a subset of a set of devices associated with that user.

If a determination is made that the user no longer has a right to access the online service, the session management platform may update the session token at 326. In some cases, this may comprise generating a set of instructions that, when executed by the user device, will cause the session token to be removed from the memory of that user device. In some embodiments, the session management platform may provide the instructions to the core network, which may then forward the instructions to the user device. In some cases, the instructions may be provided to the user device within an update (e.g., a software update) provided in a push notification. The user device, upon receiving the instructions, may delete the session token from its local memory.

At a subsequent time, the user may once more attempt to access the online service at 328. Such an attempt may be made in a manner similar to that described above with respect to 302 and 314. At 330, the user device once more initiates access to the online service by establishing a connection with the third-party server. Once more, the third-party server attempts to retrieve the session token from the user device. However, if the session token has been removed from the memory of the user device at 326, then no such session token would be available and the third-party server would then proceed to authenticate the user once more at 332 in a manner similar to that described above with respect to 306. In this way, the user is no longer able to use an outdated session token to continue to use an online service for which he or she no longer qualifies. Instead, the user is forced to provide login credentials associated with an account that qualifies to use the online service.

Figure 4:
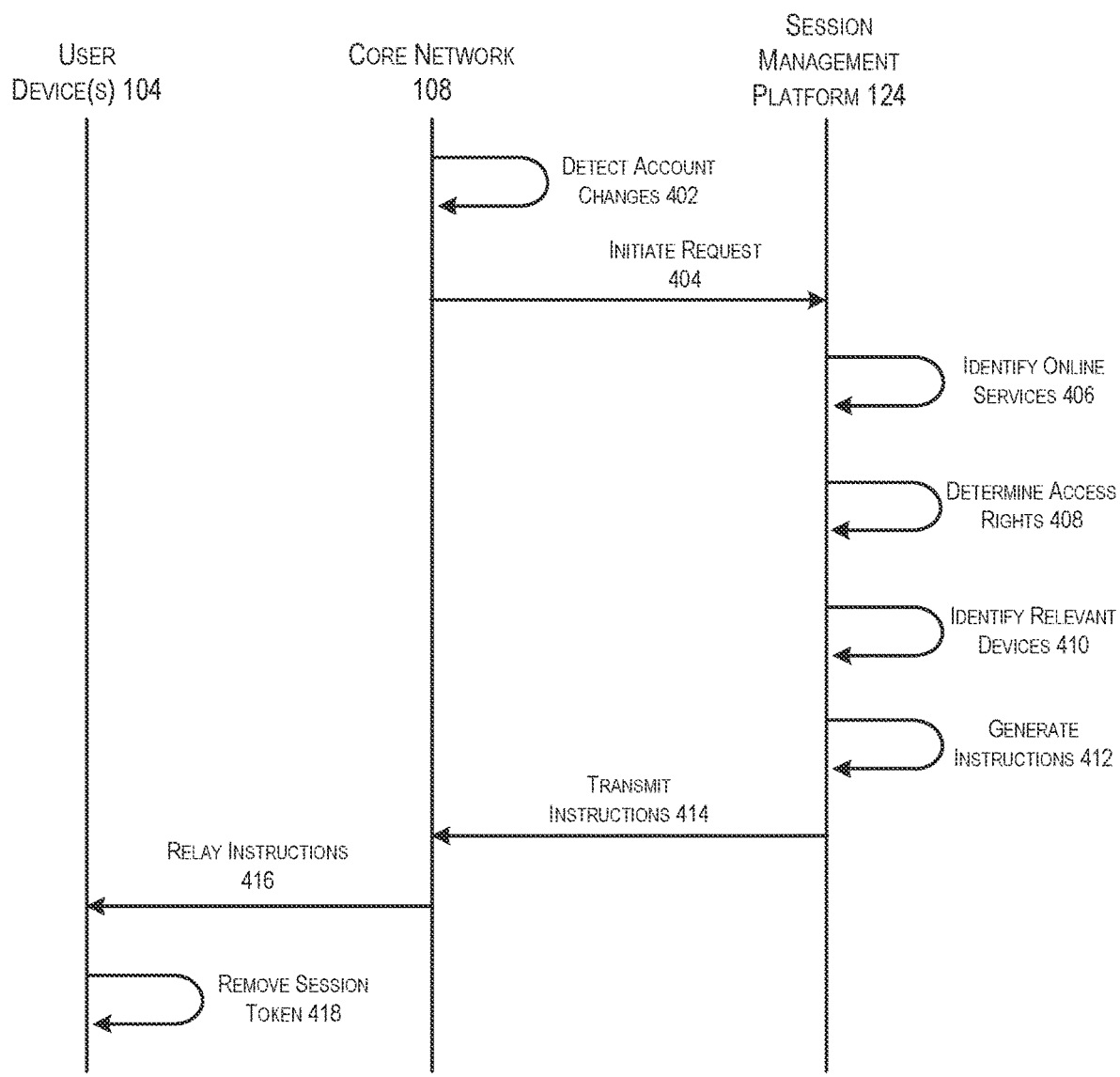
FIG. 4 depicts a flow diagram showing an example process flow for forcing reauthentication of a user of online services upon detecting a change in account status in accordance with embodiments.

FIG. 4 depicts a flow diagram showing an example process flow for forcing reauthentication of a user of online services upon detecting a change in account status in accordance with embodiments. The process 400 comprises interactions between various components of the architecture 100 described with respect to FIG. 1. More particularly, the process 400 comprises interactions between a user device 104, a core network 108 of a wireless carrier network, and a session management platform 124 of the wireless carrier network.

At 402 of the process 400, the core network of the wireless carrier may detect one or more changes made to an account of a user. For example, a user may cancel some set of services associated with his or her account, change a level of service or plan, add or remove a user device, or make any other suitable change. Upon detecting such a change, the core network of the wireless carrier may initiate a request to the session management platform at 404. It should be noted that such a request, in this scenario, may be initiated independent of any attempt to access an online service by the user.

At 406 of the process 400, the session management platform may identify a number of online services currently associated with an account of the user. In some embodiments, this number of online services may be compared to a previously generated list of online services for the user to identify online services that have been added or canceled since the previously generated list was generated. In some embodiments, the session management platform may further identify a number of third-party service providers associated with the number of online services.

At 408 of the process 400, the session management platform determines, for each service associated with the user, a level of access rights for that service. To do this, the session management platform may retrieve a set of conditions associated with access rights for the respective online service. The session management platform may then compare information associated with the user's account to the one or more conditions to determine whether that set of conditions has been satisfied. For example, a set of conditions may dictate that in order to have access rights to a particular online service, a user must maintain a minimum status with the wireless carrier network, live within a particular region, and use a particular model (or set of models) of user device. In this example, the session management platform may determine that the user's address has changed, and the user no longer lives within the particular region required by the set of conditions. Accordingly, the session management platform may determine that the user does not have access rights to the online service in this example. Upon identifying services that have been canceled at 406, the session management platform may determine that the user has no access rights in those services.

At 410 of the process 400, the session management platform may identify a number of user devices associated with the user. For example, the user may have a service plan with the wireless carrier network that is associated with four different mobile phones. In another example, the user may have previously accessed at least one online service using his or her account from both a mobile phone and a tablet computer. In this example, both the mobile phone and tablet computer may be identified. It should be noted that a number of user devices associated with a user may be identified prior to determining access rights. In some embodiments, access rights may be determined on a device-by-device basis for each of the identified devices.

At 412 of the process 400, the session management platform may generate instructions that will cause a session token to be removed from one or more of the identified user devices. In some embodiments, this may comprise identifying a location in memory and/or a naming convention used to store session tokens associated with a particular online service as well as instructions associated with a particular type (e.g., model) of user device/operating system. In some embodiments, such instructions may include methods or functions within a library of such methods that are compatible with a particular type of user device. In some embodiments, the session management platform may maintain a library of information that pertains to session token storage for a number of online services. In some embodiments, the session management platform may request a location/name of a session token for a particular user device from a provider of the online service (e.g., a third-party server).

At 414 of the process 400, the session management platform transmits the generated instructions to the core network 108 to be provided to at least one of the identified users devices. The core network then relays the generated instructions to the user device at 416. In some embodiments, the instructions may be relayed to the user device via a mobile data channel, such as a mobile communication channel that uses a long-term evolution (LTE) standard. In some embodiments, the generated instructions may be provided to the user device via a push message. In some cases, the generated instructions may be provided as a software update to be automatically executed by the user device.

At 418 of the process 400, the user device, upon receiving the generated instructions, is caused to locate the session token in its memory (if present) and delete it. In some embodiments, multiple session tokens may be removed from the memory of the user device via a single set of generated instructions.

Figure 5:
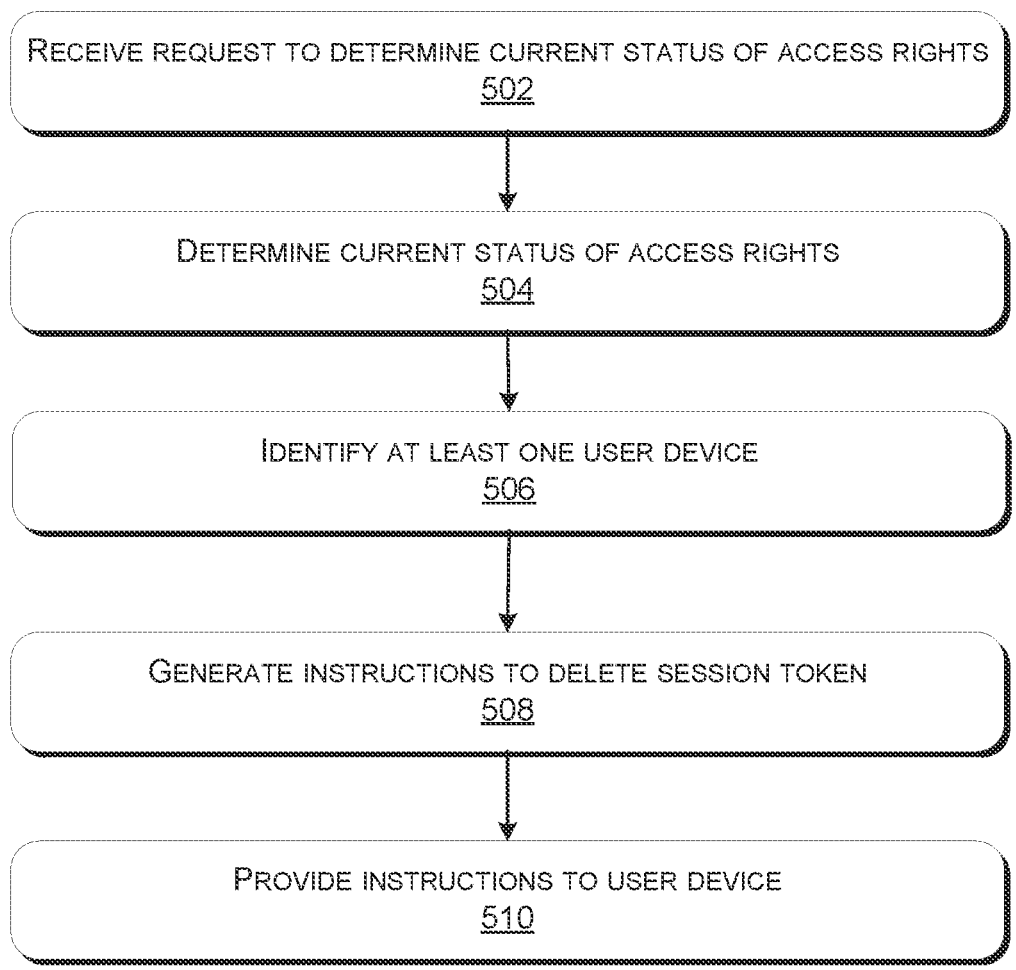
FIG. 5 depicts a flow diagram showing an example process flow for forcing authentication, or re-authentication, of a user of an online service in accordance with embodiments.

FIG. 5 depicts a flow diagram showing an example process flow for forcing authentication, or re-authentication, of a user of an online service in accordance with embodiments. The process 500 may be performed by a computing device within a wireless carrier network. For example, the process 500 may be performed by a server that performs the functionality attributed to the session management platform 124 as described herein. The process 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process.

At 502, the process 500 comprises receiving a request to determine a current status of access rights with respect to a user and at least one online service. In some embodiments, the request is received from a mobile application installed upon the at least one user device. In some embodiments, the request is received from a third-party provider of the online service. In some cases, the request is received from the third-party provider of the online service upon a determination that some predetermined amount of time has passed since a latest request to determine access rights was submitted. In some embodiments, the request is received from a core network upon detecting a change in an account associated with the user.

At 504, the process 500 comprises determining a current status of access rights for the user with respect to the online service. In some embodiments, determining a current status of access rights for the user with respect to the online service comprises retrieving one or more conditions associated with the access rights and determining an extent to which information associated with the user satisfies the one or more conditions. In some cases, the information associated with the user comprises information retrieved from an account associated with the user with the wireless carrier network.

At 506, the process 500 comprises identifying at least one user device associated with the user. In some embodiments, the at least one user device comprises multiple user devices associated with the user. The multiple user devices may be identified by virtue of having been used to access the online service in the past.

At 508, the process 500 comprises generating programmatic instructions to cause the identified user device to delete a session token. In some embodiments, the session token is associated with a set of communications between the user device and the third-party provider of the online service. The session token may be a string of random characters that is mapped to the set of communications. The session token may be associated with a previous authentication by a user such that the session token enables access to the online service without authentication.

At 510, the process 500 comprises providing the generated instructions to the user device, such that the user device is caused to execute those instructions. In some embodiments, the instructions are provided to the at least one user device via a mobile data channel. For example, the instructions may be provided via a mobile communication channel that uses a long-term evolution (LTE) standard. In some embodiments, the instructions are provided to the at least one user device within a push message as a software update.

Each of the following FIGS. 6-9 are provided by way of illustrating types of account changes that may trigger a request to the session management platform as described herein. Particularly, each of FIGS. 6-9 depict scenarios in which an account maintained by a wireless carrier network is altered in some fashion. Particularly, each of the examples depicts a case in which an account with the wireless carrier includes four "lines," each of which represent a separate right to access certain telecommunications functions of the wireless carrier network. Each of the examples depicts a change made to a first account having four lines as well as access to an online service for each of its four lines. In each of the examples, each of the four lines may be associated with a separate login for the online service at the outset of the respective example.

Figure 6:
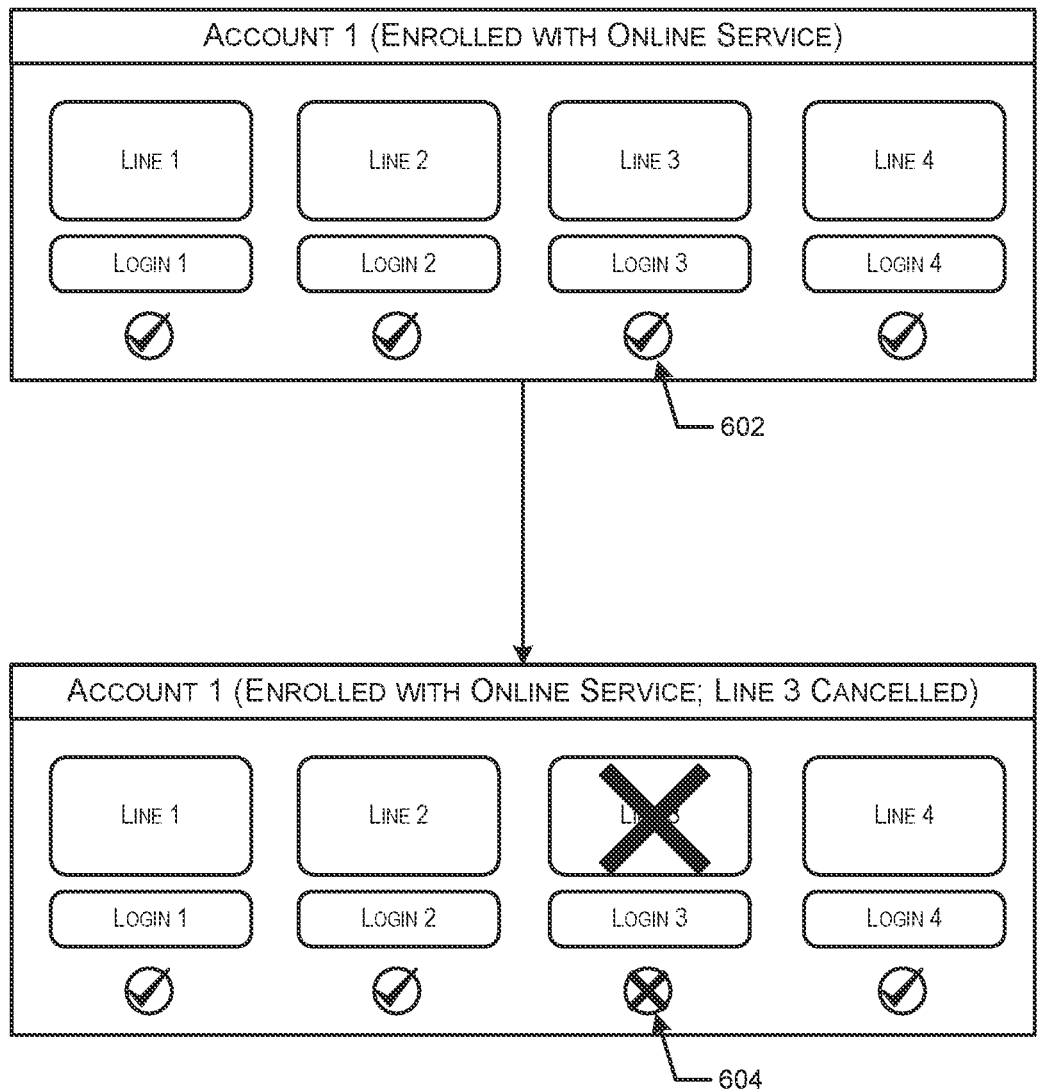
FIG. 6 depicts a first illustrative example of an account change that may result in initiation of a request to the session management platform as described elsewhere.

FIG. 6 depicts a first illustrative example of an account change that may result in initiation of a request to the session management platform as described elsewhere. In this example, a first account is depicted as including four lines (Line 1, Line 2, Line 3, and Line 4). The first account is also enrolled with an online service with respect to each of its four lines. Each of the four lines includes a separate login to the online service (Login 1, Login 2, Login 3, and Login 4). Each of the four lines may be assigned to a different user device. Each of the four lines is additionally accompanied by a status indicator 602 that indicates whether a session token is currently included within a memory of the user device associated with that line. In the illustrated example, a check mark indicates that a session token is included in a memory of the user device such that a user is not required to re-authenticate upon an attempt to access the online service using the respective login for that line. In contrast, an "X" indicates that a session token is not included in a memory of the user device such that a user would be required to re-authenticate upon an attempt to access the online service using the respective login for that line.

In this first illustrative example, an owner of the first account may remove one of the lines included on the account (e.g., Line 3 in this example). In some cases, removal of a line may be the result of the line being cancelled. In some cases, removal of a line may be the result of the line being moved from the first account to a different account. In this case, upon determining that Line 3 has been removed from the first account, a request is initiated with the session management platform as described elsewhere. The session management platform, upon receiving that request, may first identify each of the online services in which the first account has rights. Upon determining that the first account in enrolled with the online service, the session management platform may identify the login associated with the removed Line 3 (e.g., Login 3). The session management platform may then determine that Login 3 no longer has access rights to the online service. The session management platform may then identify any user devices which have been used to access the online service using Login 3. Once the user device(s) has been identified, the session management platform would then cause the session token associated with the online service on that user device to be deleted. In this current example, where each operator of a line has used its corresponding login credentials to access the online service, this would result in only the user device associated with Line 3 having its session token removed as indicated via status indicator 604.

Figure 7:
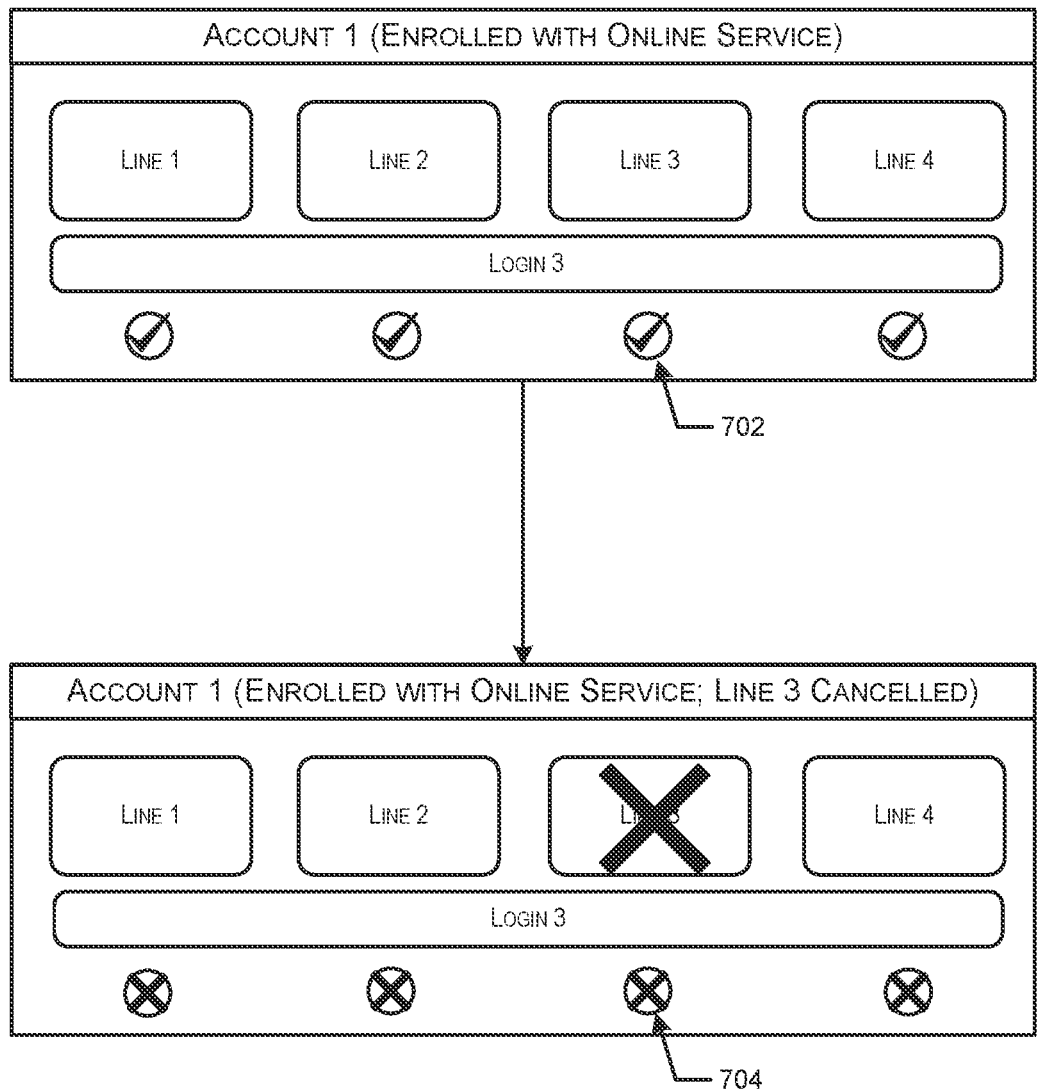
FIG. 7 depicts a second illustrative example of an account change that may result in initiation of a request to the session management platform as described elsewhere.

FIG. 7 depicts a second illustrative example of an account change that may result in initiation of a request to the session management platform as described elsewhere. Similar to the first example, a first account is depicted as including four lines (Line 1, Line 2, Line 3, and Line 4). The first account is also enrolled with an online service with respect to each of its four lines. Each of the four lines includes a separate login to the online service (Login 1, Login 2, Login 3, and Login 4). Each of the four lines may be assigned to a different user device. Each of the four lines is additionally accompanied by a status indicator 702 that indicates whether a session token is currently included within a memory of the user device associated with that line.

In this second illustrative example, an owner of the first account may remove one of the lines included on the account (e.g., Line 3 in this example). However, unlike the first example, users for each of the lines in the account in this example may have used login credentials associated with Line 3 (e.g., Login 3) to access the online service. In this case, upon determining that Line 3 has been removed from the first account, a request is initiated with the session management platform as described elsewhere. The session management platform, upon receiving that request, may first identify each of the online services in which the first account has rights. Upon determining that the first account in enrolled with the online service, the session management platform may identify the login associated with the removed Line 3 (e.g., Login 3). The session management platform may then determine that Login 3 no longer has access rights to the online service. The session management platform may then identify any user devices which have been used to access the online service using Login 3. In the present scenario, each of the user devices on the first account have used Login 3 to access the online service. Accordingly, the session management platform would then cause the session token associated with the online service to be deleted from each of the user devices associated with the account. In this current example, the session tokens are removed from each of the user devices of the account, as indicated by status indicator 704. This results in forcing each of the users of Line 1, Line 2, and Line 4 to re-authenticate upon next attempting to access the online service, which they would be able to do by providing a valid login (e.g., Login 1, Login 2, or Login 4).

Figure 8:
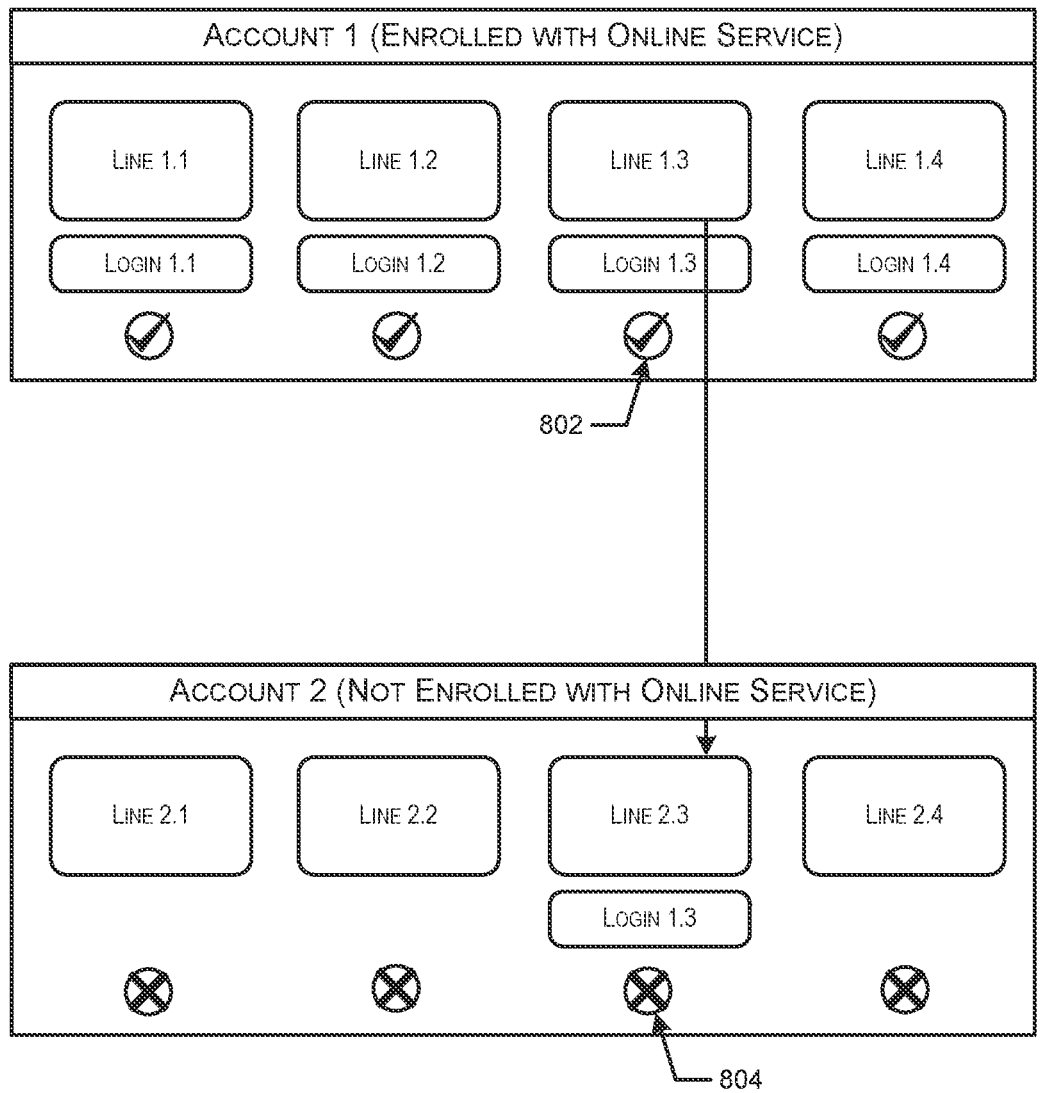
FIG. 8 depicts a third illustrative example of an account change that may result in initiation of a request to the session management platform as described elsewhere.

FIG. 8 depicts a third illustrative example of an account change that may result in initiation of a request to the session management platform as described elsewhere. Similar to the first example, a first account is depicted as including four lines (Line 1.1, Line 1.2, Line 1.3, and Line 1.4). The first account is also enrolled with an online service with respect to each of its four lines. Each of the four lines includes a separate login to the online service (Login 1.1, Login 1.2, Login 1.3, and Login 1.4). Each of the four lines may be assigned to a different user device. Each of the four lines is additionally accompanied by a status indicator 802 that indicates whether a session token is currently included within a memory of the user device associated with that line.

In this third illustrative example, Line 1.3 may be moved from the first account to a second account (Account 2). In this illustrative example, Account 1 has access rights to the online service and Account 2 does not. In a manner similar to the example of FIG. 6, the session management platform may determine that Login 1.3 no longer has access rights to the online service and may cause a session token in a user device associated with Line 1.3 to be deleted. As indicated by the status indicator 804, such a user device is no longer able to access the online service without re-authentication.

Figure 9:
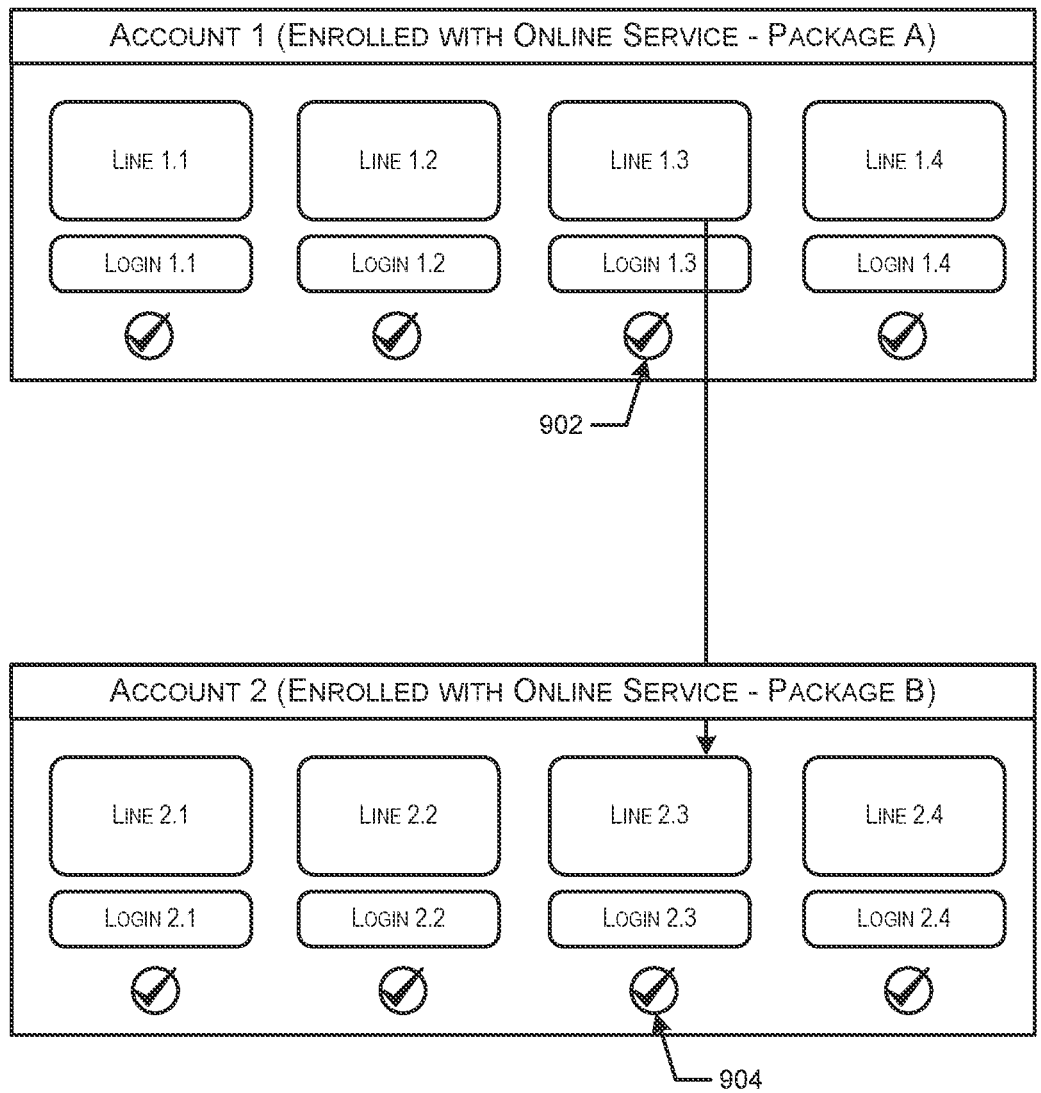
FIG. 9 depicts a fourth illustrative example of an account change that may result in initiation of a request to the session management platform as described elsewhere.

FIG. 9 depicts a fourth illustrative example of an account change that may result in initiation of a request to the session management platform as described elsewhere. Similar to the first example, a first account is depicted as including four lines (Line 1.1, Line 1.2, Line 1.3, and Line 1.4). The first account is also enrolled with an online service with respect to each of its four lines. Each of the four lines includes a separate login to the online service (Login 1.1, Login 1.2, Login 1.3, and Login 1.4). Each of the four lines may be assigned to a different user device. Each of the four lines is additionally accompanied by a status indicator 902 that indicates whether a session token is currently included within a memory of the user device associated with that line.

In this fourth illustrative example, Line 1.3 may be moved from the first account to a second account (Account 2). In this illustrative example, Account 1 has a first level of access rights to the online service (Package A) and Account 2 has a different level of access rights to the online service (Package B). In a manner similar to the example of FIG. 8, the session management platform may determine that Login 1.3 no longer has access rights to the online service and may cause a session token in a user device associated with Line 1.3 to be deleted. This would then cause the user of Line 1.3 (now Line 2.3) to be re-authenticated upon the next attempted login to the online service. However, the user is then able to provide his or her new login credentials (Login 2.3) which then grants access to the online service. A new session token can then be stored in the memory of the user device for Line 2.3 that allows access to the online service without re-authentication. As indicated by the status indicator 904, such a user device is once more able to access the online service without re-authentication.

It should be noted that the examples provided above are merely illustrative in nature and are not intended to be limiting. One skilled in the art would recognize that the scenarios presented in the above examples are not the only scenarios that could be implemented in accordance with embodiments as described herein.

What is claimed is:

1. A method comprising:
   receiving, at a wireless carrier network, a request to determine a current status of access rights of a user to access an online service provided by a third-party online service provider based on one or more conditions associated with an account of the user at the wireless carrier network, wherein the request is received from the third-party online service provider of the online service upon a determination that some predetermined amount of time has passed since a latest request to determine access rights was submitted, and wherein a user device of the user is granted access to the online service of the third-party online service provider via a session token that is generated by the third-party online service provider and stored by the wireless carrier network with the account of the user at the wireless carrier network, the session token comprising a string of random characters and being associated with a set of communications between the user device and the third-party online service provider of the online service;

determining, at the wireless carrier network, based on the one or more conditions associated with the account of the user at the wireless carrier network, the current status of access rights of the user to access the online service provided by the third-party online service provider;

upon determining that the current status of access rights indicates that the user is not authorized to access the online service of the third-party online service provider, generating, at wireless carrier network, programmatic instructions to cause the session token associated with the third-party online service provider to be removed from a memory of the user device; and providing, via the wireless carrier network, the programmatic instructions to the user device.

2. The method of claim 1, wherein the request is received from a mobile application installed upon the user device.

3. The method of claim 1, wherein the request is received from a third-party server of the third-party online service provider.

4. The method of claim 1, wherein the programmatic instructions are provided to the user device via a mobile data channel.

5. The method of claim 4, wherein the mobile data channel comprises a mobile communication channel that uses a long-term evolution (LTE) standard.

6. A computing device of a wireless carrier network, comprising:

a processor; and a memory including instructions that, when executed with the processor, cause the computing device to, at least:

receive a request to determine a current status of access rights of a user to access an online service provided by a third-party online service provider based on one or more conditions associated with an account of the user at the wireless carrier network, wherein the request is received from the third-party online service provider of the online service upon a determination that some predetermined amount of time has passed since a latest request to determine access rights was submitted, and wherein a user device of the user is granted access to the online service of the third-party online service provider via a session token that is generated by the third-party online service provider and stored by the wireless carrier network with the account of the user at the wireless carrier network, the session token comprising a string of random characters and being associated with a set of communications between the user device and the third-party online service provider of the online service;

determine, at the wireless carrier network, based on the one or more conditions associated with the account of the user at the wireless carrier network, the current status of access rights of the user to access the online service provided by the third-party online service provider;

upon determining that the current status of access rights indicates that the user is not authorized to access online service of the third-party online service provider, generate, at the wireless carrier network, programmatic instructions to cause the session token associated with the third-party online service provider to be removed from a memory of the user device; and provide, via the wireless carrier network, the programmatic instructions to the at least one user device.

7. The computing device of claim 6, wherein determining the current status of access rights for the user with respect to the online service comprises retrieving one or more conditions associated with the access rights and determining an extent to which information regarding the account associated with the user satisfies the one or more conditions.

8. The computing device of claim 7, wherein the information regarding the account associated with the user comprises at least one of an account type of the account, a payment status of the account, or a usage limit of the account.

9. The computing device of claim 6, wherein the user device is one of multiple user devices associated with the user.

10. The computing device of claim 9, wherein the multiple user devices are identified by virtue of having been previously used to access the online service.

11. The computing device of claim 6, wherein the session token enables access to the online service of the third-party online service provider without authentication.

12. The computing device of claim 11, wherein removal of the session token from the memory of the user device causes a third-party server of the third-party online service to request login credentials from the user device upon an attempt to gain access to the third-party online service using the user device.

13. The computing device of claim 12, wherein the instructions are provided to the user device as a software update.

14. The computing device of claim 6, wherein the instructions are provided to the user device within a push message.

15. A non-transitory computer-readable media of a wireless carrier network collectively storing computer-executable instructions that upon execution cause one or more computing nodes to collectively perform acts comprising:

receiving a request to determine a current status of access rights of a user to access an online service provided by a third-party online service provider based on one or more conditions associated with an account of the user at the wireless carrier network, wherein the request is received from the third-party online service provider of the online service upon a determination that some predetermined amount of time has passed since a latest request to determine access rights was submitted, and wherein a user device of the user is granted access to the third-party online service via a session token that is generated by the third-party online service provider and stored by the wireless carrier network with the account of the user at the wireless carrier network, the session token comprising a string of random characters and being associated with a set of communications between the user device and the third-party online service provider of the online service;

determining, at the wireless carrier network, based on the one or more conditions associated with the account of the user at the wireless carrier network, the current status of access rights of the user to access the online service provided by the third-party online service provider;

upon determining that the current status of access rights indicates that the user is not authorized to access the online service of the third-party online service provider, generating, at the wireless carrier network, programmatic instructions to cause the session token associated with the third-party online service provider to be removed from a memory of the user device; and providing, via the wireless carrier network, the programmatic instructions to the user device.

16. The non-transitory computer-readable media of claim 15, wherein the request is received from a mobile application installed on the user device.

17. The non-transitory computer-readable media of claim 15, wherein the request is received from a third-party server of the third-party online service provider.

* * * * *